United States Patent
Hull, Jr. et al.

(10) Patent No.: US 8,410,226 B2
(45) Date of Patent: *Apr. 2, 2013

(54) TWO-STEP PROCESS FOR BROMINATING BUTADIENE COPOLYMERS

(75) Inventors: John W. Hull, Jr., Midland, MI (US); Douglas C. Greminger, Midland, MI (US); Timothy J. Adaway, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 117 days.

This patent is subject to a terminal disclaimer.

(21) Appl. No.: 12/936,843

(22) PCT Filed: Apr. 17, 2009

(86) PCT No.: PCT/US2009/040915
§ 371 (c)(1),
(2), (4) Date: Oct. 7, 2010

(87) PCT Pub. No.: WO2009/134628
PCT Pub. Date: Nov. 5, 2009

(65) Prior Publication Data
US 2011/0065868 A1   Mar. 17, 2011

Related U.S. Application Data

(60) Provisional application No. 61/049,721, filed on May 1, 2008.

(51) Int. Cl.
*C08F 8/20* (2006.01)
*C08F 36/16* (2006.01)
*C08F 236/16* (2006.01)

(52) U.S. Cl. .................. 525/332.3; 525/356; 525/359.1; 525/378; 525/331.2; 525/331.9; 525/333.2

(58) Field of Classification Search ............... 525/331.2, 525/332.3

See application file for complete search history.

(56) References Cited

U.S. PATENT DOCUMENTS

| | | |
|---|---|---|
| 5,569,723 A | 10/1996 | Baade |
| 5,677,390 A | 10/1997 | Dadgar |
| 5,686,358 A | 11/1997 | Choi |
| 5,767,203 A | 6/1998 | Ao et al. |
| 6,232,393 B1 | 5/2001 | Dadger |
| 6,232,408 B1 | 5/2001 | Dadger |
| 6,235,831 B1 | 5/2001 | Reed |
| 6,235,844 B1 | 5/2001 | Dadgar |

(Continued)

FOREIGN PATENT DOCUMENTS

| | | |
|---|---|---|
| DD | 33801 B | 11/1964 |
| EP | 359269 A | 3/1990 |

(Continued)

OTHER PUBLICATIONS

Buckles et al, "Spectrophotometric Study of Tetrabutylammonium Tribromide", Oct. 1951.

(Continued)

*Primary Examiner* — Robert C Boyle
(74) *Attorney, Agent, or Firm* — Gary C Cohn PLLC

(57) ABSTRACT

Butadiene copolymers are brominated using certain quaternary ammonium tribromides as the brominating agent in a first step, and then with elemental bromine in a second bromination step. The bromination process proceeds easily under mild conditions, and produces a brominated product that has excellent thermal stability. The bromination proceeds to high conversions in shorter reaction times, when the bromination is performed using only the first bromination step.

11 Claims, 1 Drawing Sheet

U.S. PATENT DOCUMENTS

Figure 1:
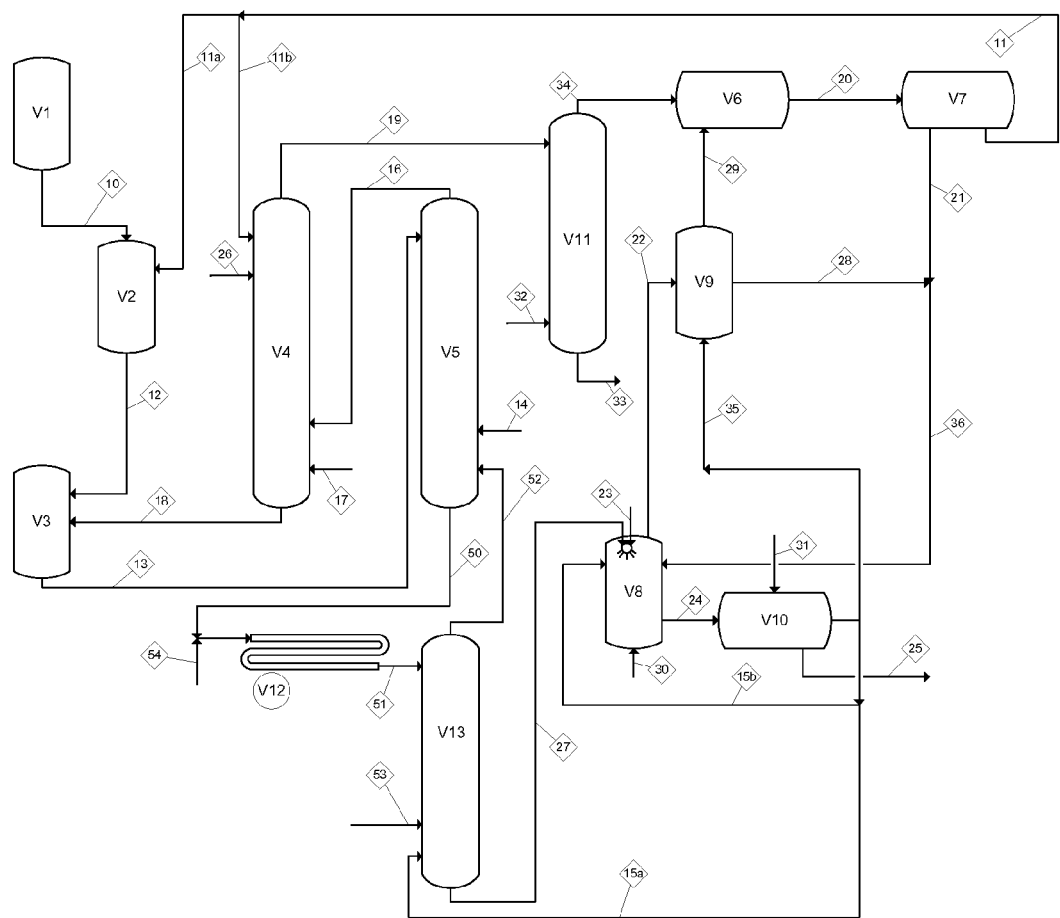

| | | | |
|---|---|---|---|
| 2008/0287559 A1 | 11/2008 | King | |
| 2009/0292079 A1 | 11/2009 | Murray | |
| 2010/0004402 A1 | 1/2010 | King | |

FOREIGN PATENT DOCUMENTS

| | | | |
|---|---|---|---|
| GB | 383154 A | | 11/1932 |
| WO | 99/55770 A | | 11/1999 |
| WO | 2007/058736 | * | 5/2007 |
| WO | 2007/058736 A | | 5/2007 |
| WO | 2008/021417 A | | 2/2008 |
| WO | 2008/021418 A | | 2/2008 |

OTHER PUBLICATIONS

Conte et al., Mimicking the vanadium Bromoperoxidases Reactions . . . , Tetrahedron Letters 35, 7429-7432 (1994).

Avramoff et al., "The Brominating Properties of Tetrametylammonium Tribromide", 1963.

Collado et al., "Nucleophilic 1,2 Addition of Bromine to Electron deficient double bonds by perbromide reagents", Tetrahedron 50, 6433-6440 (1994).

Muathen, "1,8 diazabicyclo[5.4.0]undec-7-ene hydrobromide perbromide . . . ", J. Org. Chem. 1992, 57, 2740-2741.

Bora et al., "Regioselctive Bromination of Organic Substrates . . . ", Org. Letters. 2000, 2, 247-249.

Buzdugan et al., "Bromination of Some Styrene-Diene Block Copolymers", Eur. Polym. J. 33, 1713-1716 (1997).

* cited by examiner

TWO-STEP PROCESS FOR BROMINATING BUTADIENE COPOLYMERS

This application claims priority from U.S. Provisional Patent Application No. 61/049,721, filed 1 May 2008.

The present invention relates to a process for brominating a butadiene polymer, including copolymers such as a block, random or graft copolymer of styrene and butadiene.

WO 2008/021417 describes a process for brominating a butadiene copolymer. The brominating agent is a phenyltrialkylammonium tribromide, benzyltrialkylammonium tribromide or tetraalkylammonium tribromide. The process is conducted with the copolymer in solution. A highly selective bromination of aliphatic carbon-carbon double bonds is achieved, leaving the aromatic rings essentially unaffected. The process is preferably run in a chlorinated solvent that does not contain oxygen. This helps to minimize the formation of ether groups on the polymer, which is beneficial because the ether groups often adversely affect the thermal stability of the brominated polymer. Another advantage is that surprisingly little halogen exchange occurs between the brominated polymer and the chlorinated solvent, if temperature conditions are controlled to below about 80° C.

A potential use for the brominated polymer is as a flame retardant additive for thermoplastic polymers such as polystyrene. The thermal characteristics of the brominated polymer are very important in that application. The thermoplastic polymer is typically blended with the brominated polymer in a melt blending process. The blend is in most cases simultaneously or subsequently melt processed to form a fabricated product. For example, the blend can be melt processed by extruding it to form foamed or unfoamed articles, by injection molding, by melt casting, or by other processes that involve melting the blend in order to convert it into the desired product form. The brominated polymer must be heat-stable at the temperatures encountered during the melt blending and melt processing operations. On the other hand, the brominated polymer must be able to decompose under fire conditions to liberate bromine or hydrogen bromide. If the brominated polymer is too heat-stable, it does not decompose at the correct temperature and is ineffective as a flame retardant. It has been found that a brominated polybutadiene copolymer can have the thermal characteristics which are needed for the flame retardant applications, if it is prepared carefully by minimizing certain side reactions. The process described in WO 2008/021417 produces a brominated polybutadiene copolymer having the desired thermal characteristics.

A problem with the bromination process described in WO 2008/021417 is that the reaction proceeds slowly under reaction conditions that are otherwise advantageous. After about 70-80% conversion is achieved, the bromination slows dramatically and long reaction times are required to reach high conversions. The long reaction time impacts throughput capacity in any given manufacturing equipment. The longer reaction times mean that larger or more equipment is needed to produce a given amount of product per unit time. For that reason, the process is more capital-intensive than would be desired. It would be desirable to increase the reaction rate, so throughputs can be increased and capital costs correspondingly reduced. Simply increasing the reaction rate by raising the reaction temperature is not a viable solution to this problem, because unwanted side reactions tend to become more prevalent at the higher reaction temperatures. These unwanted reactions can include the halogen exchange reaction mentioned above, as well as hydrobromination reactions, ring halogenation, halogenation at tertiary or allylic carbon atoms and the formation of hydroxyl groups, as well as others. These side reactions in most cases reduce the thermal stability of the brominated polymer, and therefore make the polymer less useful as a flame retardant additive.

Therefore, a process which can more rapidly prepare a brominated butadiene polymer having good thermal characteristics would be desired.

The present invention is a process comprising reacting a butadiene polymer containing unsaturated butadiene repeating units with a phenyltrialkylammonium tribromide, benzyltrialkylammonium tribromide or tetraalkylammonium tribromide in the presence of at least one solvent for the butadiene polymer, to form a partially brominated butadiene polymer in which from about 50 to about 96% of the butadiene repeating units are brominated, and then further reacting the partially brominated butadiene polymer with elemental bromine until more than 96% of the butadiene repeating units have been brominated.

This process is capable of achieving high levels of bromination in a much shorter time than is required when the entire bromination is performed using an ammonium tribromide as the brominating agent. Surprisingly, the product still has a very low level of impurities and is highly thermally stable, which is characteristic of the ammonium tribromide bromination products but is not typically seen when bromine is used directly as a brominating agent.

A polymer of butadiene is the starting material in this process. The butadiene polymer may be a homopolymer, or a copolymer of butadiene and one or more other monomers. A copolymer may be a random, block or graft copolymer, and should contain at least 10% by weight of polymerized polybutadiene. Butadiene polymerizes to form two types of repeating units. One type, referred to herein as "1,2-butadiene units" takes the form

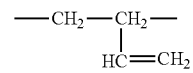

and introduce pendant unsaturated groups to the polymer. The second type, referred to herein as "1,4-butadiene" units, takes the form —$CH_2$—CH=CH—$CH_2$—, introducing unsaturation into the main polymer chain. The butadiene polymer should contain at least some 1,2-butadiene units. Of the butadiene units in the butadiene polymer, suitably at least 10%, preferably at least 15% and more preferably at least 20% and even more preferably at least 25% are 1,2-butadiene units. 1,2-butadiene units may constitute at least 50%, at least 55%, at least 60% or at least 70% of the butadiene units in the butadiene polymer. The proportion of 1,2-butadiene units may be in excess of 85% or even in excess of 90% of the butadiene units in the polymer.

Methods for preparing butadiene polymers with controlled 1,2-butadiene content are described by J. F. Henderson and M. Szwarc in *Journal of Polymer Science* (D, Macromolecular Review), Volume 3, page 317 (1968), Y. Tanaka, Y. Takeuchi, M. Kobayashi and H. Tadokoro in *J. Polym. Sci.* A-2, 9, 43-57 (1971), J. Zymona, E. Santte and H. Harwood in *Macromolecules*, 6, 129-133 (1973), and H. Ashitaka, et al., in *J. Polym. Sci., Polym. Chem.*, 21, 1853-1860 (1983).

A preferred starting material is a random, block or graft copolymer of butadiene and at least one vinyl aromatic monomer. A "vinyl aromatic" monomer is an aromatic compound having a polymerizable ethylenically unsaturated group bonded directly to a carbon atom of an aromatic ring. Vinyl aromatic monomers include unsubstituted materials such as styrene and vinyl naphthalene, as well as compounds that are substituted on the ethylenically unsaturated group (such as alpha-methylstyrene, for example), and/or are ring-substituted. Ring-substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, para-methyl styrene, and mixtures thereof.

"Vinyl aromatic units" are repeating units in the starting material that are formed when a vinyl aromatic monomer is polymerized. A suitable butadiene/vinyl aromatic starting copolymer contains from 5 to 90 percent by weight of vinyl aromatic monomer units and at least 10% by weight of polymerized butadiene.

A butadiene/vinyl aromatic copolymer may be a random, block (including multiblock such as diblock or triblock types) or graft type of copolymer. Styrene/butadiene block copolymers are widely available in commercial quantities. Those available from Dexco Polymers under the trade designation VECTOR™ are suitable. Styrene/butadiene random copolymers may be prepared in accordance with the processes described by A. F. Halasa in *Polymer*, Volume 46, page 4166 (2005). Styrene/butadiene graft copolymers may be prepared in accordance with methods described by A. F. Halasa in *Journal of Polymer Science* (Polymer Chemistry Edition), Volume 14, page 497 (1976). Styrene/butadiene random and graft copolymers may also be prepared in accordance with methods described by Hsieh and Quirk in chapter 9 of *Anionic Polymerization Principles and Practical Applications*, Marcel Dekker, Inc., New York, 1996.

The butadiene polymer may also contain repeating units formed by polymerizing monomers other than butadiene and a vinyl aromatic monomer. Such other monomers include olefins such as ethylene and propylene, acrylate or acrylic monomers such as methyl methacrylate, methyl acrylate, acrylic acid, and the like. These monomers may be randomly polymerized with the butadiene, may be polymerized to form blocks, or may be grafted onto the butadiene polymer.

The most preferred type of butadiene polymer is a block copolymer containing one or more polystyrene blocks and one or more polybutadiene blocks. Among these, diblock copolymers and triblock copolymers having a central polybutadiene block and terminal polystyrene blocks are especially preferred.

The butadiene polymer has a weight average molecular weight ($M_w$) within a range of from 1,000 to 400,000, preferably from 2,000 to 300,000, more preferably from 5,000 to 200,000 and even more preferably from 30,000 to 175,000, prior to bromination. For purposes of this invention, molecular weights are apparent molecular weights as measured by Gel Permeation Chromatography (GPC), relative to a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector, with tetrahydrofuran (THF) flowing at a rate of 1 mL/min and heated to a temperature of 35° C. as the eluent.

The brominating agent used in the first step of the bromination reaction is a quaternary ammonium tribromide selected from one or more of a phenyltrialkylammonium tribromide, benzyltrialkylammonium tribromide or a tetraalkylammonium tribromide. Examples of these include phenyltrimethylammonium tribromide, benzyltrimethylammonium tribromide, tetramethylammonium tribromide, tetraethylammonium tribromide, tetrapropylammonium tribromide, tetra-n-butylammonium tribromide and the like.

The quaternary tribromide brominating agent can be prepared by mixing the corresponding quaternary ammonium monobromide salt with elemental bromine. It is preferred to use no more than one mole of elemental bromine ($Br_2$) per mole of monobromide salt to prepare the brominating agent. More preferably, no more than 0.95 moles of elemental bromine are used per mole of monobromide salt. Excess bromine is preferably avoided, as the presence of significant amounts of elemental bromine in the first reaction step can lead to increased levels of impurities and reduced thermal stability in the brominated product.

The monobromide salt is usually water-soluble, so a convenient way of making the tribromide is to add elemental bromine to an aqueous solution of the monobromide salt. This reaction proceeds well at approximately room temperature, but higher or lower temperatures can be used if desired. The tribromide tends to precipitate from the aqueous phase, and so may be recovered from the aqueous phase by any convenient solid-liquid separation method. Because the quaternary ammonium tribromide is soluble in organic solvents, it can be separated from the aqueous phase by extraction with an organic solvent to form a solution of the quaternary ammonium tribromide in the organic solvent. The tribromide is soluble in many organic solvents and may be dissolved in such a solvent if desired to facilitate the addition of the tribromide to the starting butadiene polymer solution to form a reaction mixture. If a solution of the tribromide is to be combined with the butadiene polymer solution, the solvent used to dissolve the tribromide is preferably also a solvent for the butadiene polymer and most preferably is the same solvent used to dissolve the butadiene polymer. If the tribromide is prepared in the presence of water, it is preferably separated from the water before being contacted with the butadiene polymer.

The first bromination step is conducted by mixing the butadiene polymer, solvent and quaternary ammonium tribromide together and allowing the mixture to react until from about 50 to 96% of the butadiene units have been brominated. "Bromination" in the context of this invention refers to the addition of two bromine atoms across a carbon-carbon double bond, such that each of the carbon atoms becomes bonded to a bromine atom. The order of addition of the butadiene polymer, quaternary ammonium tribromide and solvent in the first part of the bromination reaction is not especially important, except that if the tribromide and butadiene polymer are mixed first, it is preferred to add the solvent before significant reaction occurs. It is preferred to brominate at least 60%, even more preferably at least 70% of the butadiene units in the first part of the bromination reaction. It is also preferred to brominate no more than 90% of the butadiene units in the first part of the bromination reaction, to avoid excessively long reaction times.

The extent of bromination can be controlled through the amount of quaternary ammonium tribromide that is used in the first step of the bromination reaction, or by controlling the amount of time during which the butadiene polymer is in contact with the quaternary ammonium tribromide. It has been found that when a quaternary ammonium tribromide brominating agent is used, the bromination proceeds rapidly until about 70-90% of the butadiene units have been brominated. After this point, bromination tends to proceed much more slowly. This slow reaction rate in the latter stages of the bromination reaction makes it easy in most cases to use contact times as a means to control the extent of bromination in the first part of the reaction.

About 0.5 to about 5 moles of the quaternary ammonium tribromide are suitably used per mole of butadiene units in the butadiene polymer; a more suitable amount is from about 0.6 to about 2.5 moles/mole and an even more suitable amount is from 0.7 to 1.2 moles/mole. As mentioned, the first bromination step is preferably conducted in the substantial absence of free elemental bromine (i.e., elemental bromine that has not reacted to form the quaternary ammonium tribromide). It is within the scope of the invention to generate the quaternary ammonium tribromide in situ by adding bromine to the corresponding monobromide salt in the presence of the polymer. However, in that case the rate at which bromine is added is preferably such that no excess of free elemental bromine exists in the reaction mixture.

Generally, only mild conditions are needed to effect the first step of the bromination reaction. Bromination temperatures can range from −20 to 140° C. Temperatures higher than 100° C. are not necessary and may lead to a loss of selectivity and/or an increase in by-products. The brominate temperature in the first step is preferably from 0 to 90° C. and especially from 40 to 80° C. The tribromide becomes converted to the corresponding quaternary ammonium monobromide salt as the reaction proceeds. The quaternary ammonium monobromide salt is in most cases insoluble in the solvent and the butadiene polymer, and tends to precipitate out of the polymer solution.

The first brominating step is performed in a solvent for the butadiene polymer. The solvent preferably is a solvent for the ammonium tribromide brominating agent, but not a solvent for the ammonium monobromide by-product that is formed in the reaction. Examples of suitable solvents include ethers such as tetrahydrofuran; halogenated alkanes such as carbon tetrachloride, chloroform, dichloromethane, bromochloromethane ($CH_2BrCl$), dibromomethane, 1,2-dibromoethane and 1,2-dichloroethane; hydrocarbons such as cyclohexane and toluene; and halogenated aromatic compounds such as bromobenzene, chlorobenzene and dichlorobenzene. A preferred type of solvent is one which is a liquid under the bromination conditions and which does not undesirably react with the brominating agent. The solvent is preferably aprotic and is not oxygenated, as oxygen-containing solvents can engage in addition reactions across the aliphatic double bonds of the butadiene/vinyl aromatic copolymer, leading to a deterioration of the thermal properties of the product. Halogenated and hydrocarbon solvents are therefore preferred as the solvent over oxygen-containing solvents. It has been found that halogen exchange reactions do not occur to a significant extent when mild reaction conditions are used, and for that reason chlorinated solvents, brominated solvents or solvents that contain both bromine and chlorine are very suitable for use in the invention. The solvent is used in quantities sufficient to dissolve the butadiene polymer under the conditions of the reaction. The concentration of the butadiene polymer in the solvent may range from, for example, 1 to 50% by weight, especially from 5 to 35% by weight.

Water or another solvent for the quaternary ammonium monobromide salt may be added into the first step of the bromination reaction if desired, once about 25% or more, preferably once 50% or more, of the butadiene units have been brominated. This addition has been found in some cases to speed the reaction of the butadiene polymer with the quaternary ammonium tribromide in the first step of the bromination reaction without forming high levels of impurities or significantly reducing the thermal stability of the brominated product.

After from 50 to 96%, preferably from 60 to 90% and more preferably from 70 to 90%, of the butadiene units in the starting butadiene polymer have been brominated, the partially brominated polymer is further brominated by reaction with elemental bromine. This second bromination step is conducted until more than 96% of the butadiene units in the polymer have been brominated. It may be conducted until essentially 100% of the butadiene units have been brominated, but more typically up to about 97-99% of the butadiene units are brominated.

The second bromination step can be and preferably is conducted in the substantial absence of any quaternary ammonium tribromide brominating agent. Because the quaternary ammonium monobromide salt that is formed in the first bromination step can be regenerated through contact with additional bromine, it is preferred to separate the partially brominated polymer from all or part of the quaternary ammonium monobromide before conducting the second bromination step. Various methods can be used to effect this separation. If the quaternary ammonium monobromide salt is sufficiently insoluble in the solvent, it can precipitate and be removed from the partially brominated polymer using any solid-liquid separation method such as filtering or centrifugation. The reaction solution from the first bromination step can be extracted with water or other solvent for the quaternary ammonium monobromide to remove it from the partially brominated polymer.

It is nonetheless possible to conduct the second bromination step in the presence of a quaternary ammonium tribromide. In such a case, enough bromine is provided to the system to react with any quaternary ammonium monobromide that is present to form the corresponding tribromide, plus an additional amount. This approach provides elemental bromine to the system. The free elemental bromine reacts directly with the unbrominated butadiene units that remain in the partially brominated polymer. This approach is less preferred because quaternary ammonium tribromide is present in the reaction mixture at the end of the reaction. Because the quaternary ammonium tribromide is soluble in the organic phase, it can be difficult to remove from the brominated polymer.

At least about 0.9 moles of bromine are used in the second bromination step, per mole of unbrominated butadiene units that remain in the partially brominated polymer after the first bromination step. An excess of bromine can be used if desired, but more than a two-fold excess is generally not necessary.

The second bromination step is preferably conducted in the presence of a solvent for the starting butadiene polymer, as described before.

Reaction conditions for the second part of the bromination reaction are generally mild. A temperature of up to about 100° C. can be used, but a preferred temperature is from 0 to 40° C. Pressure conditions may be atmospheric, subatmospheric or superatmospheric. Superatmospheric pressures are preferred in the case where the reaction temperature exceeds the boiling temperature of the solvent.

The second bromination step can be performed in the presence of an aliphatic alcohol, examples of which are methanol, ethanol, isopropanol, n-propanol, t-butanol, n-butanol, 2-butanol, isobutanol, n-pentanol, 2-pentanol, n-hexanol, n-octanol, cyclohexanol, 1,2-hexanediol, glycerin, sucrose, glucose, poly (vinylalcohol), alkylene glycols and alkylene glycol ethers, and the like. Preferred alcohols have secondary or tertiary alcohol groups. More preferred alcohols have secondary alcohol groups. Most preferred alcohols are those that have secondary alcohol groups. An especially preferred alcohol is isopropanol. The presence of the aliphatic alcohol in the second bromination is particularly preferred when less than 70% of the butadiene units have been brominated in the first bromination step.

The amount of aliphatic alcohol is selected such that (1) at least 0.5 mole of the alcohol is provided per mole of elemental bromine and (2) the butadiene polymer remains soluble in the reaction mixture. Some aliphatic alcohols act as antisolvents for the starting copolymer, and so their presence in excessive amounts can cause the starting copolymer to precipitate from solution. A preferred amount of the aliphatic alcohol is 0.5-6 moles/mole of elemental bromine, a more preferred amount is 0.75-3.5 moles/mole of elemental bromine, and an even more preferred amount is 1.00-1.05 moles/mole of elemental bromine. Quantities above these amounts can be used provided that the starting copolymer remains soluble. Generally, there is little need to use more than 1.05 moles of the alcohol/mole of elemental bromine.

If desired, either or both steps of the bromination reaction can be followed analytically to monitor the conversion of the aliphatic carbon-carbon double bonds. The extent of bromination can be determined using proton NMR methods. Residual aliphatic carbon-carbon double bonds can be determined by comparing integrated areas of signals due to appropriate protons (residual double bond protons are between 4.8 and 6 ppm relative to tetramethylsilane), and protons for brominated polybutadiene (signals for which are between 3.0 and 4.8 ppm). A Varian INOVA™ 300 NMR spectrometer or equivalent device is useful for such determinations, suitably being operated with a delay time of 30 seconds to maximize relaxation of protons for quantitative integrations. A deutero-substituted solvent such as deutero-chloroform or d5-pyridine is suitable for diluting the sample for NMR analysis.

After the second bromination step is complete, the brominated butadiene polymer can be recovered and purified as necessary. Methods for doing this are in general not critical to the invention. The brominated butadiene polymer may become insoluble in the reaction mixture as the bromination reaction proceeds. In such a case, the product can be recovered using any convenient solid/liquid separation method such as filtration, decantation or the like. If the brominated polymer remains soluble in the reaction mixture, it is conveniently isolated from the mixture through a suitable method such as distillation of the solvent or addition of an anti-solvent which causes the brominated copolymer to become insoluble and precipitate. Examples of such anti-solvents include lower alcohols such as methanol, ethanol and 1-propanol, 2-propanol, n-butanol, and t-butanol.

The isolated polymer may be purified to remove residual bromine, brominating agent, solvent and by-products as desired or needed for a particular application. Bromide salts may be removed by passing the polymer through silica gel or an ion exchange resin bed. The polymer may be washed with an aqueous sodium hydrogen sulfite solution to neutralize or quench unreacted brominating agent that may be present. This effectively removes or eliminates any orange color that may be present in the polymer due to residual bromine or bromine compounds.

In one particular recovery method, the crude reaction solution from the second bromination step can be formed into fine droplets. The solvent is then thermally stripped from the droplets to form particles of the brominated butadiene polymer. Either before or after the thermal stripping step, the droplets or particles are washed in a nonsolvent liquid. The brominated polymer particles formed in this way are then separated from the nonsolvent liquid. There are several approaches to doing this. In one approach, the crude reaction mixture is sprayed to form droplets, which are thermally stripped (such as by spraying them together with steam) to form brominated butadiene particles, and the particles are subsequently dispersed in a non-solvent liquid, washed and recovered. In a second approach, the crude reaction mixture is sprayed to form droplets as before, but the droplets are dispersed in the non-solvent liquid before being thermally stripped. In this case, the heat for stripping is conveniently provided by introducing steam below the surface of the non-solvent liquid. In a third variation, the crude reaction mixture is introduced into the non-solvent liquid and formed into droplets while in the non-solvent liquid. The droplets are again thermally stripped while dispersed in the non-solvent liquid, where they are also washed.

By combining both bromination steps in accordance with the invention, it is possible to significantly reduce the time needed to brominate a very high percentage of the carbon-carbon double bonds of the butadiene units in the polymer. In general, the time required to brominate 96% or more of the butadiene units can be reduced by up to several hours using this approach, compared to bromination reactions conducted using only the quaternary ammonium tribromide brominating agents. The total reaction time needed to achieve 96% or more bromination is often less than two hours and can be one hour or less in an optimized industrial process, depending of course on reaction temperatures.

Another significant advantage of the invention is that the bromination is selective, and few impurities are formed. This is somewhat surprising, as a number of impurities tend to form when bromine is used as the sole brominating agent, which in most cases result in a significant loss of thermal stability in the brominated polymer.

Yet another advantage is that lower reaction temperatures can be used, while achieving equivalent reaction times.

Thus, in the process described above, little or no bromination occurs on the aromatic rings. Otherwise, bromination tends to take place at the carbon-carbon double bonds of both 1,2- and 1,4-butadiene units, and bromination tends to take place so that little bromination occurs at tertiary or allylic carbon atoms. It is believed that the bromination occurs through an ionic mechanism, rather than a free radical mechanism that tends to introduce unwanted bromine at tertiary carbon atoms. Tertiary bromines are believed to adversely affect the temperature stability of the brominated copolymer. Hydrobromination, or the addition of HBr across a carbon-carbon double bond, has been found to be minimal using this process.

As a result of this, the brominated copolymer products have excellent thermal stability. A useful indicator of thermal stability is a 5% weight loss temperature, which is measured by thermogravimetric analysis as follows: 10 milligrams of the polymer is analyzed using a TA Instruments model Hi-Res TGA 2950 or equivalent device, with a 60 milliliters per minute (mL/min) flow of gaseous nitrogen and a heating rate of 10° C./min over a range of from room temperature (nominally 25° C.) to 600° C. The mass lost by the sample is monitored during the heating step, and the temperature at which the sample has lost 5% of its initial weight is designated the 5% weight loss temperature (5% WLT). This method provides a temperature at which a sample has undergone a cumulative weight loss of 5 wt %, based on initial sample weight. The brominated copolymer preferably exhibits a 5% WLT of at least 230° C. The 5% WLT is preferably at least 240° C., more preferably at least 250° C. and even more preferably at least 260° C.

A further increase in thermal stability is sometimes seen if the brominated butadiene polymer is treated with an alkali metal base. The alkali metal base may be, for example, a hydroxide or a carbonate. The alkali metal base is preferably an alkali metal alkoxide, as the alkali metal alkoxides tend to provide more of an increase in thermal stability than do some other bases, such as alkali metal hydroxides, carbonates or carboxylates. The alkali metal can be lithium, sodium, potassium or cesium. Lithium, sodium and potassium are preferred. The alkoxide ion can contain from 1 to 8, preferably from 1 to 4, carbon atoms, with methoxide and ethoxide being especially preferred. Especially preferred alkali metal alkoxides are lithium methoxide, sodium methoxide, potassium methoxide, lithium ethoxide, sodium ethoxide and potassium ethoxide. The brominated butadiene polymer can be treated with as little as 0.01 mole of the alkali metal base per mole of polymerized butadiene units in the copolymer (whether brominated or unbrominated). There is no upper limit on the amount of alkali metal base, although cost and handling considerations mitigate against using more than about 1 mole of the alkali metal base per mole of polymerized (brominated or unbrominated) butadiene units in the copolymer. A preferred amount is from 0.03 to 0.50 moles/mole of polymerized (brominated or unbrominated) butadiene units, and an especially preferred amount is from 0.05 to 0.20 moles/mole.

The FIGURE is a schematic diagram of an embodiment of the process of the invention.

In the FIGURE, starting butadiene polymer is fed from holding tank V1 through line 10 to dissolution vessel V2. Line 10 may include some feeding means for transferring the solid butadiene polymer from vessel V1 into dissolution vessel V2. The solid butadiene polymer is suitably in the form of a particulate to facilitate feeding. The feeding means can be a conveyer belt, a screw feeder, or any other suitable device.

Solvent is fed into dissolution vessel V2 from line 11a, and the butadiene polymer is dissolved in the solvent in dissolution vessel V2 to produce a butadiene polymer solution. The solvent fed from line 11a is a recycle solvent stream in the embodiment shown. Alternatively, fresh solvent can be used to produce the butadiene polymer solution, or some combination of fresh solvent and recycled solvent can be used.

The butadiene polymer solution is transferred to reactor V3 through line 12. A solution of a quaternary ammonium tribromide is introduced into reactor V3 through line 18. The butadiene polymer and the quaternary ammonium tribromide react in reactor V3 to produce a partially brominated butadiene polymer as described before. At least a portion of the quaternary ammonium tribromide is converted to a quaternary ammonium monobromide by-product.

Reactor V3 can be either a continuous or batch reactor. Continuous reactors are generally preferred when reaction kinetics are fast because the equipment is smaller and thus less costly. Surge vessels between units operations are generally smaller as well. If desired, multiple reactors V3 can be used in parallel or in series, instead of the single reactor shown in the FIGURE.

The reaction that occurs in reactor V3 produces a mixture of partially brominated butadiene polymer, solvent and quaternary ammonium monobromide. Some residual quaternary ammonium tribromide may be present. An aqueous phase may be present in some embodiments of the invention. The mixture may contain small quantities of other materials. The partially brominated butadiene polymer will be partially or entirely dissolved in the solvent. The quaternary ammonium monobromide has little solubility in the solvent, and so tends to precipitate from the reaction mixture unless an aqueous phase is present. Therefore, the reaction mixture produced in reactor V3 is usually in the form of a slurry, with quaternary ammonium monobromide and perhaps some of the partially brominated butadiene polymer being suspended in the solvent. If an aqueous phase is present, the quaternary ammonium monobromide may be dissolved in the aqueous phase, in which case the reaction mixture is a two-phase system which may contain some undissolved quaternary ammonium monobromide and/or undissolved brominated butadiene polymer.

The reaction mixture is transferred to first extraction column V5 (as shown, via line 13). One or more pumps or other apparatus for effecting the transfer (not shown) can be used. If reactor V3 is a batch reactor, one or more holding tanks can be interposed between reactor V3 and first extraction column V5. First extraction column V5 is most conveniently operated in a continuous manner. One or more holding tanks facilitate the transition from an upstream batch process to a continuous process starting at first extraction column V5.

The solution or slurry of the partially brominated butadiene polymer is extracted in first extraction column V5 with an aqueous phase that contains a reducing agent. In the embodiment shown, the aqueous phase is the extract from third extraction column V13, which is transferred to first extraction column V5 via line 52. Sufficient reducing agent is added to third extraction column V13 via line 53 that there is enough residual reducing agent in the aqueous extract that is transferred to first extraction column V5 via line 52 to neutralize the remaining tribromide present in the partially brominated butadiene polymer. Alternatively, additional reducing agent can be added directly to first extraction column V5 via stream 14.

As shown, first extraction vessel V5 is operated countercurrently. The arrangement illustrated assumes that the solvent will be denser than the water. In such a case, the partially brominated butadiene polymer solution is introduced from line 13 near the top of first extraction column V5 and travels downwardly through the column. Water and the reducing agent are introduced lower in first extraction column V5, and travel upward through the column.

Quaternary ammonium monobromides are transferred into the aqueous phase in first extraction column V5, and in that manner are removed from the solution or slurry of the partially brominated butadiene polymer. As mentioned, the reducing agent converts any residual quaternary ammonium tribromides, which are soluble in the solvent, to the corresponding monobromide salts, which are less soluble in the solvent but more soluble in the aqueous phase. This increases the efficiency of the extraction, ensuring high recovery of the valuable quaternary ammonium monobromide salt.

An aqueous quaternary ammonium monobromide solution is withdrawn from near the top of first extraction column V5 and transferred via line 16 to second extraction column V4. In the embodiment shown, additional wash water, which may be recycled from another portion of the process, is introduced into second extraction column V4 via line 17. Line 17 can, for example, divert a portion of the recycle stream from line 15a or 15b into second extraction column V4. It is also within the scope of the invention to omit the additional wash water altogether.

The aqueous quaternary ammonium monobromide solution is contacted with bromine and the solvent in second extraction column V4. In the embodiment shown, second extraction column V4 is operated countercurrently, and again assumes that the solvent is denser than water. Therefore, the quaternary ammonium monobromide solution (and additional recycle water, if any) is introduced near the bottom of second extraction column V4. As shown, bromine is added through line 26. The bromine can be added as a solution in the solvent. Solvent is added near the top of extraction column V4, through line 11b. It is possible to add the bromine and solvent as a single stream. However, it is preferred to add the bromine separately from the bulk of the solvent, and to add the bromine below the solvent to reduce bromine losses in the aqueous raffinate. Fresh recycle solvent contacts the aqueous raffinate before that solution leaves second extraction column V4. Traces of entrained bromine in the aqueous raffinate are thus extracted into the fresh recycle solvent. Similarly, the additional wash water preferably is added to second extraction column V4 below the quaternary ammonium monobromide feed (as shown). This allows the wash water to extract traces of entrained quaternary ammonium monobromide from the quaternary ammonium tribromide solution. These separate water and solvent additions allow the monobromide, which partitions strongly into the aqueous phase, to be converted efficiently to the quaternary ammonium tribromide species, which in turn partitions strongly into the solvent phase.

Therefore, a solution of the quaternary ammonium tribromide is formed in second extraction column V4. This solution is recycled back into reactor V3 through line 18. If reactor V3 is a batch reactor, or if otherwise necessary, one or more holding tanks can be interposed within line 18 between second extraction column V4 and reactor V3. As before, holding tanks can facilitate a transition from the preferred continuous operation of second extraction column V4 and a batch operation in reactor V3.

The extractions and reactions in the first extraction column V5 and second extraction column V4 can be performed in an agitated batch mixing vessel if desired or necessary, but this generally requires larger more expensive equipment and intermediate storage vessels. It is preferred to perform these extractions in continuous devices, and more preferably in multistage devices. Often multistage columns or differential contactor columns are preferred for economic reasons.

A washed solution or slurry of the partially brominated butadiene polymer is formed in first extraction column V5. This solution of slurry is transferred via line 50 to bromination reactor V12. In the embodiment shown, this reactor is a continuous plug flow reactor. Alternatively, a continuously stirred tank reactor (CSTR) or series of CSTRs could be used in place of the plug flow reactor. Bromine or a mixture of bromine and solvent is introduced via line 54 into bromination reactor V12 and flows cocurrently with the partially brominated butadiene polymer. The bromine and the partially brominated butadiene polymer react in bromination reactor V12 to further brominate the polymer until more than 96% of the butadiene units on the starting butadiene polymer have been brominated. The brominated polymer thus formed is withdrawn through line 51 and transferred to third extraction column V13, where the brominated polymer is washed.

Water is introduced into the bottom of third extraction column V13, again assuming that the solvent is more dense than water in this embodiment. As shown, water is recycled from recovery unit V10 via line 15a. In the embodiment shown, water travels upwardly through third extraction column V13 and the organic phase travels downwardly. Neutralizing agents and/or reducing agents can be introduced into third extraction column V13 through line 53. This arrangement allows for good control of the rate of reducing agent addition, and allows one to handle a smaller volume reducing agent stream. Adding more of the water via line 15a is believed to help transfer any reducing agent that may be entrained in the solvent phase into the aqueous phase and thus produce an extracted polymer solution with fewer ionic impurities. Alternatively, it is within the scope of the invention to introduce all of the water and reducing agent into third extraction vessel V13 in a single stream. Water containing residual reducing agent is removed from the top of third extraction column V13 through line 52. In the embodiment shown, water is transferred via line 52 to first extraction column V5.

The organic phase exits third extraction column through line 27. It contains washed brominated butadiene polymer in the form of a solution or slurry in the solvent. The brominated butadiene polymer is recovered from that washed solution or slurry, to produce a solid brominated butadiene product and a solvent stream. All or a portion of the solvent stream can be recycled back into the process.

As shown in the FIGURE, the solution or slurry of the brominated butadiene polymer is withdrawn from third extraction column V13 through line 27, and transferred to recovery vessel V8. The brominated butadiene polymer is separated from the solvent in recovery vessel V8, producing a brominated butadiene polymer stream 24 and a mixed vapor stream 22.

Various approaches to recovering the brominated butadiene polymer can be used, and the design and operation of recovery vessel V8 will of course reflect the particular approach that is chosen. The solvent can be evaporated from the solution or slurry. Alternatively, the brominated butadiene polymer can be precipitated from the solution or slurry by addition of an antisolvent.

In a preferred embodiment, the washed solution or slurry entering recovery vessel V8 is formed into fine droplets. The solvent is thermally stripped from the droplets to form particles of the brominated butadiene polymer. Before or after the thermal stripping step, the droplets or particles are washed with water. This produces a wet, particulate brominated butadiene stream which can be filtered and/or dried to recover the product.

In the embodiment shown in the FIGURE, the brominated butadiene solution or slurry exiting third extraction vessel V13 is transferred via line 27 and sprayed into recovery vessel V8. Recovery vessel V8 is partially filled with water. As shown, the solution or slurry is sprayed into the head space of recovery vessel V8 to form droplets, which fall into the water in recovery vessel V8. The solvent can be thermally stripped from the droplets while they are falling, before they reach the level of the water. Alternatively, the solvent can be stripped from the droplets after they have fallen into the water and become dispersed there. It is possible to remove part of the solvent before the droplets reach the water, and the rest of the solvent once the droplets have become dispersed in the water. The water phase is preferably agitated in some manner to keep the droplets dispersed until the solvent is removed and the brominated polymer has precipitated to form solid particles.

A source of heat is provided within recovery vessel V8 in order to strip the solvent from the droplets. A preferred heat source is directly injected steam. In the embodiment shown in the FIGURE, steam is introduced into recovery vessel V8 in two places, though line 23 and line 30. Line 23 introduces steam very close to the point at which the brominated butadiene polymer droplets are introduced, which is preferred.

An especially preferred apparatus for introducing the steam in this manner is a two-fluid nozzle which atomizes the brominated butadiene solution or slurry into droplets and introduces the steam and the droplets together into recovery vessel V8. A portion of the steam in Line 23 may bypass the two-fluid nozzle and be added at very close to the two-fluid nozzle at a low velocity relative to the spray from the two-fluid nozzle to provide additional thermal energy without adding atomizing energy. Line 30 introduces steam below the surface of the fluid in recovery vessel V8. In the preferred embodiment, the steam flowrate introduced through line 23 is larger than the steam flowrate introduced through line 30. In an alternative embodiment, all the steam can be introduced via line 30.

In another alternative embodiment, the droplets and preferably steam as well are introduced below the surface of the water in recovery vessel V8. Again, a two-fluid nozzle can be used to introduce the materials.

A mixed vapor stream 22 containing steam as well as solvent vapor exits recovery vessel V8. Solvent that is contained in mixed vapor stream 22 preferably is recycled back into the process as mentioned before. Mixed vapor stream 22 may contain entrained tiny polymer particles, which should be removed from the stream and preferably recovered. As shown in the FIGURE, mixed vapor stream 22 is transferred to particle scrubber V9, where tiny polymer particles are scrubbed out with hot water that suitably is recirculated internally in the scrubber. The scrubber water should be hot enough to prevent condensation of either steam or solvent. A preferred way to heat the scrubber water is with directly injected steam, which can be injected at any convenient location. To prevent solids from accumulating in the circulating scrubber water, a portion of the circulating scrubber water (containing polymer particles) is removed from particle scrubber V9 through line 28. To prevent depletion of the circulating scrubber water, additional water is introduced into particle scrubber V9 through line 35. The rate of water addition to particle scrubber V9 through line 35 should be approximately equal to the rate at which water is removed though line 28. Water introduced through line 35 preferably is recycled from another part of the process. As shown, the water is recycled wash water from polymer recovery unit V10. The scrubbed vapor is then transferred via line 29 to condenser vessel V6. As shown, the water (with entrained brominated polymer particles) withdrawn from particle scrubber V9 via line 28 is recycled through line 36 back into recovery vessel V8.

Solvent and steam are condensed in condenser vessel V6, and the resulting water/solvent mixture is transferred via line 20 to separator V7, where the water and solvent are permitted to phase separate. Separator V7 can be a decanter or other apparatus for separating liquid phases. The solvent phase is then recycled through line 11. As shown, a portion of the recycled solvent is recycled back to second extraction column V4 via line 11b, and another portion of the recycled solvent is recycled back to dissolution vessel V2 via line 11a. It is preferred that at least a portion of the recycled solvent is recycled back to second extraction column V4. The water phase is recycled to recovery vessel V8 through lines 21 and 36. For convenience, the recycled water phase in lines 21 and 36 may be mixed with the dilute water slurry in line 28 before entering recovery vessel V8.

The aqueous raffinate stream produced in second extraction column V4 contains ionic impurities, the nature of which depends on the particular reducing agent and buffering agent introduced in stream 14. If sodium thiosulfate and sodium hydroxide are used, the byproducts will be sodium bromide and sodium sulfate. It is preferred to remove any residual solvent from the aqueous raffinate stream before processing it further for recovery of the bromide or disposal.

In the embodiment shown in the FIGURE, the aqueous raffinate stream is withdrawn from second extraction column V4 through line 19 and stripped in stripper column V11 to remove residual solvent. A preferred stripping method is steam stripping. As shown, steam is supplied to stripper column V11 via line 32. The vapors from stripper column V11 preferably are condensed, recovered and recycled. As shown, the vapors from stripper column V11 are sent to condenser V6 through line 34. If desired, the contents of lines 34 and 29 can be combined before being introduced into condenser V6. It is also possible to use separate condensation apparatus for each of lines 34 and 29. Similarly, a single decanter V7 can be used to separate the resulting liquid phases recovered from lines 34 and 29 (as shown), or separate decanters can be provided. A waste stream 33, which contains ionic impurities, is withdrawn from stripper column V11 and removed from the process.

A slurry of the brominated butadiene polymer particles in water is removed from recovery vessel V8 through line 24. The water and brominated butadiene polymer particles are separated in polymer recovery unit V10. Polymer recovery unit V10 includes any suitable liquid-solid separation device, such as a filter, centrifuge and the like. Most of the water recovered from polymer recovery unit V10 may be recycled directly to recovery vessel V8 through line 15b and/or third extraction column V13 via line 15a. Additional water may be added into polymer recovery unit V10 through line 31 to wash impurities from the solid polymer particles. If the amount of recycle water needed in the various upstream processes exceeds the amount of available recycle water, fresh water can be added directly to supplement or replace the recycle water. The recovered brominated butadiene polymer is removed from polymer recovery unit V10 (such as through line 25), from which it can be further processed by, for example, drying, compacting and packaging.

The FIGURE is intended only as a schematic representation of a preferred embodiment of the process. It includes various preferred or optional features. The FIGURE is not intended to show specific engineering features or details, including the specific design of the various components shown. In addition, auxiliary equipment such as various valves, pumps, heating and cooling equipment, analytical and/or control devices and the like are not shown, but of course can be used as necessary or desirable.

The process may include features in addition to those described before or shown in the FIGURE. For example, the process may include means for taking various purge streams as a way to remove accumulating impurities from the process. Fresh reagent or solvent may be added to replenish the amounts purged from the system.

Another optional but preferred step of the process is the introduction of various additives to the brominated butadiene polymer during the process. A convenient place to add the additives is into the washed brominated butadiene polymer solution or slurry that is withdrawn from third extraction vessel V13 via line 27 in the FIGURE. Additives that are liquids or are soluble in the solvent are readily added to the brominated butadiene polymer at this point in the process. A blending vessel can be interposed in line 27 for introducing the additive or additives. Examples of additives that can be added in this way include flame retardant additives, flame retardant adjuvants, thermal stabilizers, ultraviolet light stabilizers, nucleating agents, antioxidants, foaming agents, acid scavengers and coloring agents The brominated butadiene polymer is useful as a flame retardant additive for a variety of organic polymers. Organic polymers of interest include vinyl aromatic or alkenyl aromatic polymers (including alkenyl aromatic homopolymers, alkenyl aromatic copolymers, or blends of one or more alkenyl aromatic homopolymers and/or alkenyl aromatic copolymers), as well as other organic polymers in which the brominated copolymer is soluble or can be dispersed to form domains of less than 25 µm, preferably less than 10 µm, in size. Enough of the brominated butadiene polymer is preferably present in the blend to provide the blend with a bromine content within a range of from 0.1 percent by weight to 25 percent by weight, based upon blend weight.

Blends of the brominated butadiene polymer may include other additives such as other flame retardant additives, flame retardant adjuvants, thermal stabilizers, ultraviolet light stabilizers, nucleating agents, antioxidants, foaming agents, acid scavengers and coloring agents.

The following examples are provided to illustrate the invention, but not to limit the scope thereof. All parts and percentages are by weight unless otherwise indicated.

Comparative Run A

A solution of 17.2 grams of tetrapropylammonium monobromide (0.065 mol) in 100 mL of dibromomethane is premixed with 3 mL of bromine (0.059 mol) to form a solution of the corresponding tribromide. A solution of 5 grams of a styrene-butadiene-styrene tri-block copolymer containing 60% by weight butadiene (0.056 mol) in 100 mL of dibromomethane is mixed with the tribromide solution and the resulting mixture is divided into 8 parts. Each mixture is heated to 100° C. with stirring in a closed container. The mixtures are removed at various times and quenched by shaking their contents with an excess of isopropyl alcohol to precipitate the polymer. The solids are filtered, washed with isopropyl alcohol, and air dried. The dried samples are analyzed by proton NMR to measure the conversion of the double bonds of the polymerized butadiene units. The % conversion vs. time for this run is as indicated in Table 1.

TABLE 1

Conversion vs. Time for Comparative Run 1

| Reaction Time (min) | % Conversion |
|---|---|
| 0 | 0 |
| 10 | 77.0 |
| 15 | 83.4 |
| 20 | 87.6 |
| 25 | 89.3 |
| 30 | 91.4 |
| 45 | 93.5 |
| 60 | 93.7 |

The data in Table 1 demonstrates how the bromination reaction slows dramatically once the conversion of butadiene double bonds reaches about 75%, when a quaternary ammonium tribromide is used as the brominating agent. An extended reaction time is needed to achieve a conversion of 96% or higher.

EXAMPLE 1

Tetrapropylammonium monobromide (16.4 g, 0.062 mol) and 400 mL of methylene chloride are mixed with bromine (2.8 mL, 0.055 mol) to form a tetrapropylammonium tribromide solution. A portion of the same polystyrene-polybutadiene-styrene triblock copolymer used in Comparative Run A (10 parts, 60% (0.111 mol) polybutadiene) is added to the tetrapropylammonium tribromide solution in a 1-L round bottom flask equipped with overhead stirrer and reflux condenser. The mixture is heated to reflux (40° C.) for two hours. The heat is removed, 400 mL of water is added, and the mixture is stirred for 15 minutes. The organic phase is recovered and washed twice with 200 mL portions of water. This produces a colorless organic phase. Approximately 50% of the butadiene units in the starting polymer have been brominated.

The organic phase is then mixed with a solution of 3.4 mL of bromine in 30 mL of methylene chloride for 1 hour at about 23° C. The solution is washed with 300 mL of an aqueous sodium hydrogen sulfate solution, and then with two 300 mL portions of water. The organic phase is then reduced to about 50% of its volume on a rotary evaporator to provide about 300 mL of a milky solution. The milky solution is added dropwise to 700 mL of isopropanol to precipitate the polymer. The solids are collected, rinsed with fresh isopropanol and dried in a vacuum overnight at 60° C. 22.4 g of brominated polymer are recovered.

Total reaction time is three hours, at reaction temperatures that are much lower than that used in Comparative Run A.

The total bromine content by neutron activation analysis (NAA) is 61.6+/−0.9%. Free bromide is 72 parts per million by ion chromatography (IC). The 5% WLT of the product is 210° C. By proton NMR, the brominated polymer contains 1% unreacted butadiene double bonds. 7.4% of the bromine bonded to the polymer is bonded to tertiary or allylic carbon atoms.

EXAMPLE 2

Tetrapropylammonium monobromide (17.9 g, 0.067 mol) and 400 mL of methylene chloride are mixed with bromine (2.8 mL, 0.055 mol) to form a tetrapropylammonium tribromide solution. The same polystyrene-polybutadiene-styrene triblock copolymer used in Comparative Run A (10 g, 60% (0.111 mol) polybutadiene) is added to the tetrapropylammonium tribromide solution in a 1-L round bottom flask with overhead stirrer and reflux condenser. The mixture is heated to reflux (40° C.) for 60 minutes. After this, 400 mL of water is added, and the mixture is stirred and refluxed for another 40 minutes. The organic phase is recovered and washed with a 200 mL portion of water. This produces a colorless organic phase. Approximately 50% of the butadiene units in the starting polymer have been brominated.

The organic phase is then mixed with 6.7 g of isopropanol (0.111 mol) and a solution of 3.4 mL (0.066 mol) of bromine in 30 mL of methylene chloride for 1 hour at about 23° C. The solution is then washed with 300 mL of an aqueous sodium hydrogen sulfate solution, and then with two 200 mL portions of water. The organic phase is then reduced to about 50% of its volume on a rotary evaporator to provide about 175 mL of a milky solution. The milky solution is added dropwise to 700 mL of stirring isopropanol to precipitate the polymer. The solids are collected, rinsed with fresh isopropanol and dried in a vacuum overnight at 60° C. 23.2 g of brominated polymer are recovered.

Total reaction time is just over three hours, at reaction temperatures that are much lower than that used in Comparative Run A.

The 5% WLT of this product is 245° C. The much higher 5% WLT of this product, compared to that obtained in Example 1, is believed to be due to the presence of a lower level of bromine atoms bonded to tertiary or allylic carbon atoms (4.4% vs. 7.4% in Example 1). The presence of isopropanol in the second bromination step may contribute to this effect. By proton NMR, the brominated polymer contains 3.1% unreacted butadiene double bonds. Total bromine content by NAA is 61.2+/−0.9%. Free bromide by IC is 20 ppm. Total chlorine by XRF is 82+/−8 ppm.

EXAMPLE 3

Tetrapropylammonium monobromide (22.0 g, 0.083 mol) and 400 mL of methylene chloride are mixed with bromine (4.0 mL, 0.078 mol) to form a tetrapropylammonium tribromide solution. The same polystyrene-polybutadiene-styrene triblock copolymer used in Comparative Run A (10 parts, 60% (0.111 mol) polybutadiene) is added to the tetrapropylammonium tribromide solution in a 1-L round bottom flask equipped with overhead stirrer and reflux condenser. The mixture is heated to reflux (40° C.) using a heating mantle for five hours. The heating mantle is removed, 400 mL of water is added, and the mixture is stirred for 15 minutes. The organic phase is recovered and washed twice with 200 mL portions of water. This produces a colorless organic phase. Approximately 70% of the butadiene units in the starting polymer have been brominated.

The organic phase is then mixed with a solution of 2.4 mL (0.047 mol) of bromine in 25 mL of methylene chloride for 1 hour in an ice bath. The ice bath is removed and the mixture is stirred for another 15 minutes. The solution is then washed with 300 mL of an aqueous sodium hydrogen sulfate solution, and then with 350 mL of water. The organic phase is then reduced to about 50% of its volume on a rotary evaporator to provide a milky solution, which is washed with water. The washed solution is added dropwise to 700 mL of stirring isopropanol to precipitate the polymer. The solids are collected, rinsed with fresh isopropanol and dried in a vacuum overnight at 60° C. 23.7 g of brominated polymer are recovered.

The total bromine content by NAA is 63.5+/−0.9%. Free bromide is 14 parts per million by IC. The 5% WLT of the product is 246° C. By proton NMR, the polymer contains 2.5% unreacted butadiene double bonds; 2.3% of the bromine bonded to the polymer is bonded to tertiary or allylic carbon atoms. Total chlorine by XRF is 400+/−40 ppm.

EXAMPLE 4

Tetrapropylammonium monobromide (13.0 g, 0.049 mol) and 200 mL of methylene chloride are mixed with bromine (2.4 mL, 0.047 mol) to form a tetrapropylammonium tribromide solution. The same polystyrene-polybutadiene-styrene triblock copolymer used in Comparative Run A (5 grams, 60% (0.056 mol) polybutadiene) is added to the tetrapropylammonium tribromide solution in a 1-L round bottom flask equipped with overhead stirrer and reflux condenser. The mixture is stirred at 23° C. for 23 hours. The solution is washed with three-200 mL portions of water and reduced to about 50% of its volume on a rotary evaporator. Approximately 84% of the butadiene units in the starting polymer have been brominated.

The organic phase is then chilled in an ice bath. A solution of 1.4 mL (0.027 mol) of bromine in 30 mL of methylene chloride is added over 15 minutes, and the mixture is then stirred for another 5 minutes. The solution is then washed with 200 mL of an aqueous sodium hydrogen sulfate solution, and then with two 200 mL portions of water. The organic phase is then reduced by 50% in volume on a rotary evaporator to provide a colorless solution. The solution is added dropwise to 300 mL of stirring isopropanol to precipitate the polymer. The solids are collected, rinsed with fresh isopropanol and dried in a vacuum overnight at 60° C. 11.0 g of brominated polymer are recovered.

The total bromine content by NAA is 63.7+/−0.9%. Free bromide is less than the 3.9 ppm detection limit of the equipment. The 5% WLT of the product is 263° C. By proton NMR, the polymer contains 1.6% unreacted butadiene double bonds; 1.7% of the bromine atoms bonded to the polymer are bonded to tertiary or allylic carbon atoms.

EXAMPLE 5

Tetrapropylammonium monobromide (32.1 g, 0.1 mol) and 200 mL of methylene chloride are mixed with bromine (4.0 mL, 0.078 mol) to form a tetrapropylammonium tribromide solution. The same polystyrene-polybutadiene-styrene triblock copolymer used in Comparative Run A (5 grams, 60% (0.056 mol) polybutadiene) is added to the tetrapropylammonium tribromide solution in a 1-L round bottom flask equipped with overhead stirrer and reflux condenser. The mixture is stirred at 23° C. for 91 hours. The solution is washed with two 200-mL portions of water, then with a 200 mL sodium hydrogen sulfate solution, and then with 200 mL portions of water. The organic phase is then reduced to about 50% of its volume on a rotary evaporator. The concentrated organic solution is added dropwise into 350 mL of stirring isopropanol to precipitate the polymer. The solids are filtered, washed with fresh isopropanol and dried overnight in a vacuum oven at 60° C. 11.8 g of dry solids are obtained. Total bromine by NAA is 62.8+/−0.9%. Free bromide by IC is 284 ppm. Total chlorine by XRF is 790+/−80 ppm. Approximately 96% of the butadiene units in the starting polymer have been brominated.

4.7 g of this partially brominated polymer is dissolved in 100 mL of methylene chloride. A solution of bromine in methylene chloride is added at 23° C. until a strong red color persists, and the mixture is then stirred for another 30 minutes. The solution is then washed with 150 mL of an aqueous sodium hydrogen sulfate solution, and then with two 150 mL portions of water. The solution is added dropwise to 300 mL of stirring isopropanol to precipitate the polymer. The solids are collected, rinsed with fresh isopropanol and dried in a vacuum over at 60° C. 3.5 g of brominated polymer are recovered.

The total bromine content by NAA is 64.0+/−0.9%. Free bromide by IC is 25 ppm. Total chlorine by XRF is 790+/−80 ppm. The 5% WLT of the product is 249° C. By proton NMR, the polymer contains 0.3% unreacted butadiene double bonds; 0.7% of the bromine atoms bonded to the polymer are bonded to tertiary or allylic carbon atoms.

The data from Examples 1-5 are summarized in Table 2.

TABLE 2

| Ex. | % Bromination, 1st step | Temp. (1st/2nd Steps) | % Conversion | % bromine bonded to tertiary or allylic carbons (NMR) | 5% WLT (° C.) | Free Br, ppm (IC) | % Total Br (NAA) |
|---|---|---|---|---|---|---|---|
| 1 | 50% | 40/23 | 99.0 | 7.4 | 210 | 72 | 61.6 |
| 2 | 50% | 40/23 | 96.9 | 4.4 | 245 | 20 | 61.2 |

TABLE 2-continued

| Ex. | % Bromination, 1st step | Temp. (1st/2nd Steps) | % Conversion | % bromine bonded to tertiary or allylic carbons (NMR) | 5% WLT (° C.) | Free Br, ppm (IC) | % Total Br (NAA) |
|---|---|---|---|---|---|---|---|
| 3 | 70% | 40/5 | 97.5 | 2.3 | 246 | 14 | 63.5 |
| 4 | 84% | 23/5 | 98.4 | 1.7 | 263 | <3.9 | 63.7 |
| 5 | 96% | 23/23 | 99.7 | 0.7 | 249 | 25 | 64.0 |

What is claimed is:

1. A process comprising reacting in a first step a butadiene polymer containing unsaturated butadiene repeating units with a phenyltrialkylammonium tribromide, benzyltrialkylammonium tribromide or tetraalkylammonium tribromide in the presence of at least one solvent for the butadiene polymer, to form a partially brominated butadiene polymer in which from about 50 to about 96% of the butadiene repeating units are brominated, and then further reacting the partially brominated butadiene polymer in a second step with elemental bromine until greater than 96% of the butadiene repeating units have been brominated.

2. The process of claim 1, wherein from 60 to 90% of the butadiene units of the butadiene polymer are brominated in the first step.

3. The process of claim 2, wherein the phenyltrialkylammonium tribromide, benzyltrialkylammonium tribromide or tetraalkylammonium tribromide is phenyltrimethylammonium tribromide, benzyltrimethylammonium tribromide, tetramethylammonium tribromide, tetraethylammonium tribromide, tetrapropylammonium tribromide or tetra-n-butylammonium tribromide.

4. The process of claim 3, wherein water is added into the first step after 50-70% of the butadiene units of the starting butadiene polymer are brominated.

5. The process of claim 4, wherein an aliphatic alcohol is present in the second step.

6. The process of claim 5, wherein the butadiene polymer is a homopolymer of butadiene or a copolymer of butadiene and a vinyl aromatic monomer.

7. The process of claim 6, wherein the butadiene polymer is a block copolymer of styrene and butadiene.

8. The process of claim 7, wherein the temperature during the first step is from 0 to 90° C.

9. The process of claim 8 wherein the temperature during the first step is from 40 to 80° C.

10. The process of claim 9 wherein the temperature during the second step is from 0 to 40° C.

11. The process of claim 10 wherein the second step is conducted in the presence of from 0.5 to 6 moles of an aliphatic alcohol per mole of elemental bromine, and further wherein the butadiene polymer remains in solution during said second step.

* * * * *